(12) United States Patent
Mitsugi

(10) Patent No.: US 6,912,523 B2
(45) Date of Patent: Jun. 28, 2005

(54) OBJECT DATA RETRIEVING DEVICE, OBJECT DATA RETRIEVING METHOD, AND COMPUTER-READABLE RECORDING MEDIUM CONTAINING RECORDER DATA

(75) Inventor: Tatsuya Mitsugi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/424,661

(22) PCT Filed: Aug. 18, 1998

(86) PCT No.: PCT/JP98/03661

§ 371 (c)(1), (2), (4) Date: Nov. 29, 1999

(87) PCT Pub. No.: WO00/11572

PCT Pub. Date: Mar. 2, 2000

(65) Prior Publication Data

US 2002/0174084 A1 Nov. 21, 2002

(51) Int. Cl.⁷ ............................................. G06F 17/30
(52) U.S. Cl. ............................................. 707/3; 704/9
(58) Field of Search ................... 707/1–10, 100–104.1, 707/200–205; 704/2, 8, 9; 701/201

(56) References Cited

U.S. PATENT DOCUMENTS

| | | | | |
|---|---|---|---|---|
| 5,299,125 A | * | 3/1994 | Baker et al. | 704/9 |
| 5,424,947 A | * | 6/1995 | Nagao et al. | 704/9 |
| 5,634,051 A | * | 5/1997 | Thomson | 707/5 |
| 5,873,056 A | * | 2/1999 | Liddy et al. | 704/9 |
| 5,948,040 A | * | 9/1999 | DeLorme et al. | 340/990 |
| 5,963,940 A | * | 10/1999 | Liddy et al. | 707/5 |
| 6,026,388 A | * | 2/2000 | Liddy et al. | 707/1 |
| 6,076,088 A | * | 6/2000 | Paik et al. | 707/5 |
| 6,202,064 B1 | * | 3/2001 | Julliard | 707/5 |

FOREIGN PATENT DOCUMENTS

JP  A9257501  10/1997

OTHER PUBLICATIONS

Ohyama, Minoru et al, Connection by Inputting a Communication Object, "An Intelligent Switching System" pp. 47–51, Aug, 23, 1985 (with English language translation).

* cited by examiner

Primary Examiner—Mohammad Ali
(74) Attorney, Agent, or Firm—Birch, Stewart, Kolasch & Birch, LLP

(57) ABSTRACT

Object data is stored in association with a plurality of attribute words categorized according to sentence elements of a natural language, and an object data search is efficiently narrowed using a simple search criterion input. A database stores object data in association with a plurality of attribute words categorized according to the sentence elements of a natural language. An input unit receives an input of a search criterion in the form of a sentence of the natural language. A criterion retrieval unit analyzes the search criterion in the form of the sentence and retrieves one of a plurality of search words respectively corresponding to sentence element categories of the natural language. An object retrieval unit searches the database using each of the search words respectively associated with the sentence element categories, retrieves the object data associated with the attribute words that match a single search word or a plurality of search words wherein relationships existing between at least said one of said plurality of search words corresponding to the sentence element categories of the natural language are used with information features associated with the attribute words to further refine searching and an output apparatus for outputting the object data retrieved.

14 Claims, 7 Drawing Sheets

| | NAME | LATITUDE | LONGITUDE | S | V | O | C | KEYWORD | TEXT |
|---|---|---|---|---|---|---|---|---|---|
| | | 14a | 14b | 14c | 15a | 15b | 15c | 15d | 15e | 15f |
| 1 | ABC | LAT.35°30'26.32"N | LONG.135°25'45.33"E | LARGE VEHICLE | PARK | PARKING LOT | ROOFED | CLOSE TO STATION | ACCOMMODATES 30 CARS |
| 2 | DEF | LAT.35°30'40.23"N | LONG.135°30'45.33"E | FAMILY | EAT | RESTAURANT | TOP FLOOR | SPECIALIZES IN FRENCH CUISINE | DIRECTLY OPERATED BY *** |
| ⋮ | | | | | | | | | |

FIG.1

| | NAME | LATITUDE | LONGITUDE | LOCATION | KEYWORD | TEXT |
|---|---|---|---|---|---|---|
| | 14a | 14b | 14c | 19a | 19b | 19c |
| 1 | ABC | LAT.35°30'26.32"N | LONG.135°25'45.33"E | PARKING LOT | CLOSE TO STATION | ACCOMMODATES 30 CARS |
| 2 | DEF | LAT.35°30'40.23"N | LONG.135°3045.33"E | RESTAURANT | SPECIALIZES IN FRENCH CUISINE | DIRECTLY OPERATED BY *** |
| ..... | | | | | | |

14 = {14a, 14b, 14c}
19 = {19a, 19b, 19c}

RETURN DATA RECEPTION

FIG.6

| | NAME | LATITUDE | LONGITUDE | S | V | O | C | KEYWORD | TEXT |
|---|---|---|---|---|---|---|---|---|---|
| | 14a | 14b | 14c | 15a | 15b | 15c | 15d | 15e | 15f |
| 1 | ABC | LAT.35°30'26.32"N | LONG.135°25'45.33"E | LARGE VEHICLE | PARK | PARKING LOT | ROOFED | CLOSE TO STATION | ACCOMMODATES 30 CARS |
| 2 | DEF | LAT.35°30'40.23"N | LONG.135°30'45.33"E | FAMILY | EAT | RESTAURANT | TOP FLOOR | SPECIALIZES IN FRENCH CUISINE | DIRECTLY OPERATED BY *** |
| ..... | | | | | | | | | |

(14 = {14a,14b,14c}; 15 = {15a,15b,15c,15d,15e,15f})

OBJECT DATA RETRIEVING DEVICE, OBJECT DATA RETRIEVING METHOD, AND COMPUTER-READABLE RECORDING MEDIUM CONTAINING RECORDER DATA

This application is the national phase under 35 U.S.C. § 371 of PCT International Application No. PCT/JP98/03661 which has an International filing date of Aug. 18, 1998, which designated the United States of America.

TECHNICAL FIELD

The present invention relates to an object data search apparatus and object data search method for searching for a plurality of object data items stored in a database and to a computer-readable recording medium in which data is stored, and, more particularly, to improvement for efficiently narrowing a search for object data using a simple search criterion input.

BACKGROUND ART

FIG. 1 is a diagram showing a structure of a database, illustrating a schema (logical structure) of a database for an object data search apparatus according to the related art. Referring to FIG. 1, reference numeral 14 indicates destination data having a name attribute 14a, a latitude attribute 14b, a longitude attribute 14c and the like of a destination. Numeral 19 indicates search data having a location attribute 19a, a keyword attribute 19b and a text attribute 19c. A tuple for each destination is comprised of attribute words related to these attributes.

In the illustrated example, the location attribute 19a of "parking lot", the keyword attribute 19b of "close to station" and the text attribute 19c of "accommodates 30 cars" are associated with the destination data having the name attribute 14a of "ABC". Also, the location attribute 19a of "restaurant", the keyword attribute 19b of "specializes in French cuisine" and the text attribute 19c of "directly operated by" are associated with the destination data having the name attribute 14a of "DEF".

A description will now be given of the operation.

When a search word is input to a database management system (DBMS) (not shown) coupled to the database, the DBMS searches the database based on the search word. More specifically, when the search word is related to the location attribute 19a, for example, the search is conducted based on the location attribute 19a based on the search word, so as to retrieve a tuple associated with an attribute word that matches the search word. The destination data for the retrieved tuple is output as search result.

Since the object data search apparatus according to the related art is constructed as described above, a search can only be conducted based on the attribute word associated with "object of action" categories such as the location attribute 19a, the keyword attribute 19b and the text attribute 19c.

Accordingly, when narrowing a search in the search word categorization structure as described above using a plurality of search words, the search word should be input one by one. Alternatively, an advanced search criterion provided for each object data search apparatus may be used to relate a plurality of search words to each other to conduct a search. Particularly, when a search for destination facility as mentioned is conducted by radio in a car navigation system, the aforementioned deficiency in the search narrowing capability presents a serious problem when the system is poorly constructed or when the data transfer rate in the communication channel is relatively low.

In a known approach according to the related art for conducting a search using a simple search criterion input; i.e., without using an advanced search criterion, search words associated with the destination data (object data) are classified hierarchically. The hierarchy is sequentially selected top down until the target object data is identified. In such an approach, however, the hierarchy should always be selected top down. For each selection, a large quantity of data may be transferred over a communication channel that may have a low data transfer rate. For this reason, this kind of approach is not suitably used in a car navigation system.

The present invention has been developed in order to resolve the aforementioned problems and has an object of providing an object data search apparatus, object data search method and a computer-readable recording medium storing data, capable of efficiently narrowing a search for object data and suitable for use in a car navigation system or the like.

DISCLOSURE OF THE INVENTION

The present invention provides an object data search apparatus comprising: a database for storing object data in association with a plurality of attribute words categorized according to sentence elements of a natural language; an input unit for receiving an input of a search criterion in the form of a sentence of the natural language; a criterion retrieval unit for analyzing the search criterion in the form of the sentence and retrieving one of a plurality of search words respectively corresponding to sentence element categories of the natural language; an object retrieval unit for searching the database using each of the search words respectively associated with the sentence element categories, and retrieving the object data associated with the attribute words that match the a single search word or the plurality of search words; and an output apparatus for outputting the object data thus retrieved.

The object data search apparatus comprises: a database for storing object data in association with a plurality of attribute words categorized according to sentence elements of a natural language; an input unit for receiving an input of a search criterion in the form of a sentence of the natural language; a criterion retrieval unit for analyzing the search criterion in the form of the sentence and retrieving one of a plurality of search words respectively corresponding to sentence element categories of the natural language; an object retrieval unit for searching the database using each of the search words respectively associated with the sentence element categories, and retrieving the object data associated with the attribute words that match the single search word or the plurality of search words; and an output apparatus for outputting the object data thus retrieved. Therefore, by inputting the search criterion using a natural language, a complex search criterion including a plurality of search words can be input for a search. Accordingly, it is easy for even an inexperienced person to input a complex search criterion. Moreover, narrowing of a search for destination data can be efficiently conducted with the complex search criterion.

The database stores destination data at least associated with an attribute word having an agent of action category, an attribute word having an action category and an attribute word having an object of action category.

Since the database stores destination data at least associated with an attribute word having an agent of action category, an attribute word having an action category and an attribute word having an object of action category, it is possible to efficiently narrow a search for a destination data by inputting the number of people, category of people, type of action and object of action using a sentence format of a natural language.

The present invention provides an object data search method comprising the steps of: retrieving a single search word or a plurality of search words from a search criterion input in the form of a sentence of a natural language by analyzing the search criterion in accordance with a grammar of the natural language; conducting a search relative to a plurality of sentence element categories associated with a plurality of object data items, based on the single search word or the plurality of search words; and retrieving the object data associated with the attribute word that matches the single search word or the plurality of search words and outputting the object data thus retrieved.

An object data search method according to the invention comprises the steps of: retrieving a single search word or a plurality of search words from a search criterion input in the form of a sentence of a natural language by analyzing the search criterion in accordance with a grammar of the natural language; conducting a search relative to a plurality of sentence element categories associated with a plurality of object data items, based on the single search word or the plurality of search words; and retrieving the object data associated with the attribute word that matches the single search word or the plurality of search words and outputting the object data thus retrieved. Therefore, by inputting the search criterion using a natural language, a complex search criterion including a plurality of search words can be input for a search. Accordingly, it is easy for even an inexperienced person to input a complex search criterion. Moreover, narrowing of a search for destination data can be efficiently conducted with the complex search criterion.

The search according to the invention is conducted using at least a search word having an agent of action category, a search word having an action category and a search word having an object of action category.

Since the search according to the invention is conducted using at least a search word having an agent of action category, a search word having an action category and a search word having an object of action category, it is possible to efficiently narrow a search for a destination data by inputting the number of people, category of people, type of action and object of action using a sentence format of a natural language.

The computer-readable recording medium according to the invention stores data according to a relational database structure, wherein tuples each comprising an object data item and a plurality of attribute words categorized according to sentence elements of a natural language are stored.

Since the tuples each comprising an object data item and a plurality of attribute words categorized according to sentence elements of a natural language are stored, a complex search criterion including a plurality of search words can be input for a search, by inputting the search criterion using a natural language. Accordingly, it is easy for even an inexperienced person to input a complex search criterion. Moreover, narrowing of a search for destination data can be efficiently conducted with the complex search criterion.

BRIEF DESCRIPTION OF THE DRAWINGS

FIG. 1 is a diagram showing a structure of a database, illustrating an example of schema (logical structure) of a database according to the related art;

FIG. 6 is a diagram showing a structure of a database, illustrating an example of schema (logical structure) of a database according to the first embodiment;

BEST MODE FOR CARRYING OUT THE INVENTION

The present invention will be described in terms of the best mode for carrying out the invention with reference to the accompanying drawings.

First Embodiment

Figure 2:
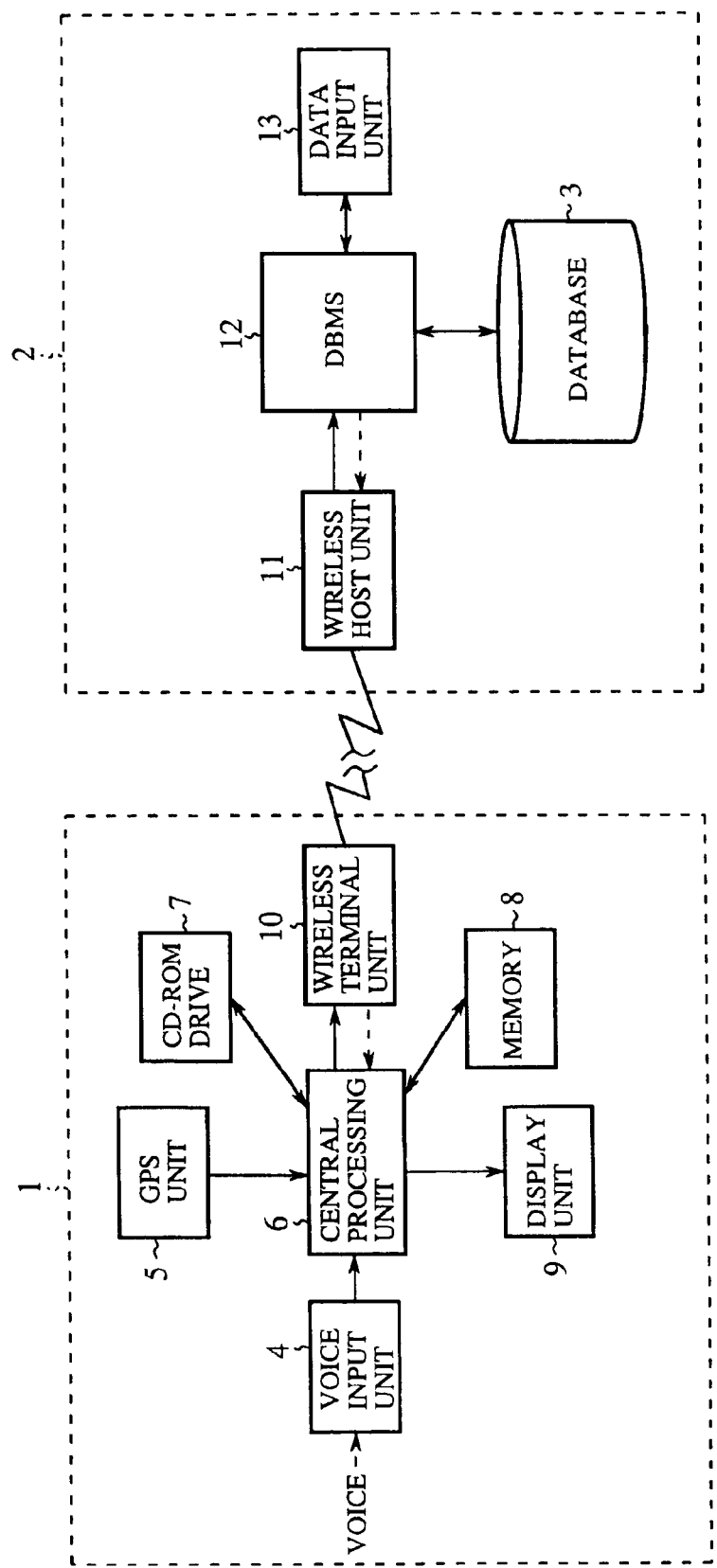
FIG. 2 is a block diagram showing a structure of an object database search apparatus according to a first embodiment of the present invention.

FIG. 2 is a block diagram showing a structure of an object database search apparatus according to a first embodiment of the present invention. The database shown in FIG. 2 has a database structure for use in a car navigation system for searching for and supplying information related to various facilities. Referring to FIG. 2, reference numeral 1 indicates a car navigation system, 2 indicates a navigation server supplied with information related to various facilities from the facilities via a telephone line or the like, storing the supplied information, and connected to the car navigation system 1 via a portable phone (telephone line) or the like to enable search for and supply of the information related to the facilities. Numeral 3 indicates a database storing destination data and the like according to the relational database structure; 4 indicates a voice input unit for outputting a voice signal responsive to voice input; 5 indicates GPS (Global Positioning System) for outputting location information determined based on a satellite wave; 6 indicates a central processing unit receiving the voice signal, the location information and the like, and generating display information; 7 indicates a CD-ROM drive for reading data from a CD-ROM storing map data and the like; 8 indicates a memory such as a D-RAM for temporarily storing various data; 9 indicates a display unit such as a CRT display device, liquid crystal display device, plasma display device or the like for displaying the display information; 10 indicates a wireless terminal unit for wireless communication; 11 indicates a wireless host unit for wireless communication with the wireless terminal unit; 12 indicates a database management system (DBMS) for managing the database 3 and conducting a search; 13 indicates a data input unit for writing data to the database 3 via the DBMS 12.

A DVD-ROM drive may be used in place of the CD-ROM drive. The wireless host unit 11 may not be directly connected to the wireless terminal unit 10 by radio. Connection may be established via a telephone line or a Web page on the Internet.

A description will now be given of the operation.

Figure 3:
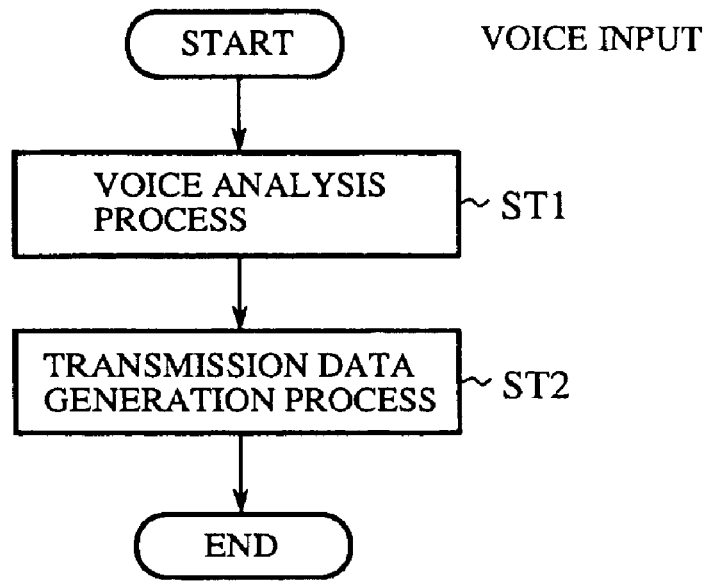
FIG. 3 is a flowchart showing a search criterion generation process by a central processing unit according to the first embodiment.

FIG. 3 is a flowchart showing a search criterion generation process by the central processing unit 6 according to the first embodiment. Referring to FIG. 3, step ST1 is a criterion retrieval step where the voice signal from the voice input unit 4 is analyzed in accordance with a sentence grammar of a natural language and a single search word or a plurality of search words corresponding to sentence element categories of the natural language are retrieved. Step ST2 is a step for generation transmission of data where the single search word or the plurality of search words thus retrieved are superimposed on a predetermined transmission data format so that the data is output to the wireless terminal unit 10.

Figure 4:
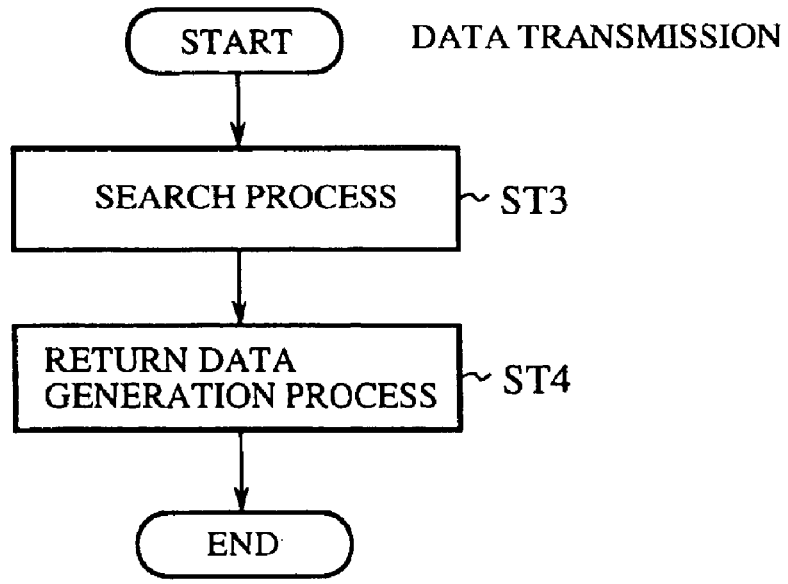
FIG. 4 is a flowchart showing a search process by a DBMS according to the first embodiment.

FIG. 4 is a flowchart showing a search process by the DBMS 12 according to the first embodiment. Referring to FIG. 4, ST3 is a search step where the database 3 is searched based on the single search word or the plurality of search words included in the data received from the wireless host unit 11. Step ST4 is a return data generation step where the single data item or a plurality of destination data items obtained as the search results are superimposed on a predetermined return data format so that the return data is output to the wireless host unit 11.

Figure 5:
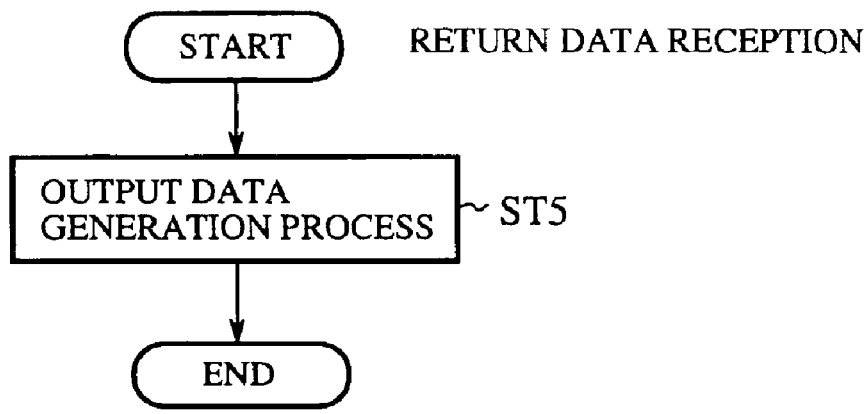
FIG. 5 is a flowchart showing a search result display process by the central processing unit according to the first embodiment.

FIG. 5 is a flowchart showing a search result display process by the central processing unit 6 according to the first embodiment. Referring to FIG. 5, step ST5 is an output data generation step for generating display data based on the one or the plurality of destination data items included in the received data output from the wireless terminal unit 10.

A description will now be given of the relational database structure and a method for searching same according to the first embodiment.

FIG. 6 is a diagram showing a structure of a database, illustrating an example of schema (logical structure) of the database 3 according to the first embodiment. Referring to FIG. 6, reference numeral 14 indicates destination data (object data) having attributes such as the name attribute 14a, the latitude attribute 14b, the longitude attribute 14c of a destination. Numeral 15 indicates search data having an S attribute 15a (agent of an action category), a V attribute 15b (action category), an O attribute 15c (object of action category), a C attribute 15d (object of action category) and a keyword attribute 15e and a text attribute 15f. A tuple for each destination is comprised of attribute words related to these attributes.

In the illustrated example, the S attribute 15a of "large vehicle", the V attribute 15b of "park", the O attribute 15c of "parking lot", the C attribute 15d of "roofed", the keyword attribute 15e of "close to station" and the text attribute 15f of "accommodates 30 cars" are associated with the destination data item having the name attribute 14a of "ABC". The S attribute 15a of "family", the V attribute 15b of "eat", the O attribute 15c of "restaurant", the C attribute 15d of "top floor", the keyword attribute 15e of "specializes in French cuisine" and the text attribute 15f of "directly operated by ***" are associated with the destination data item having the name attribute 14a of "DEF".

Figure 7:
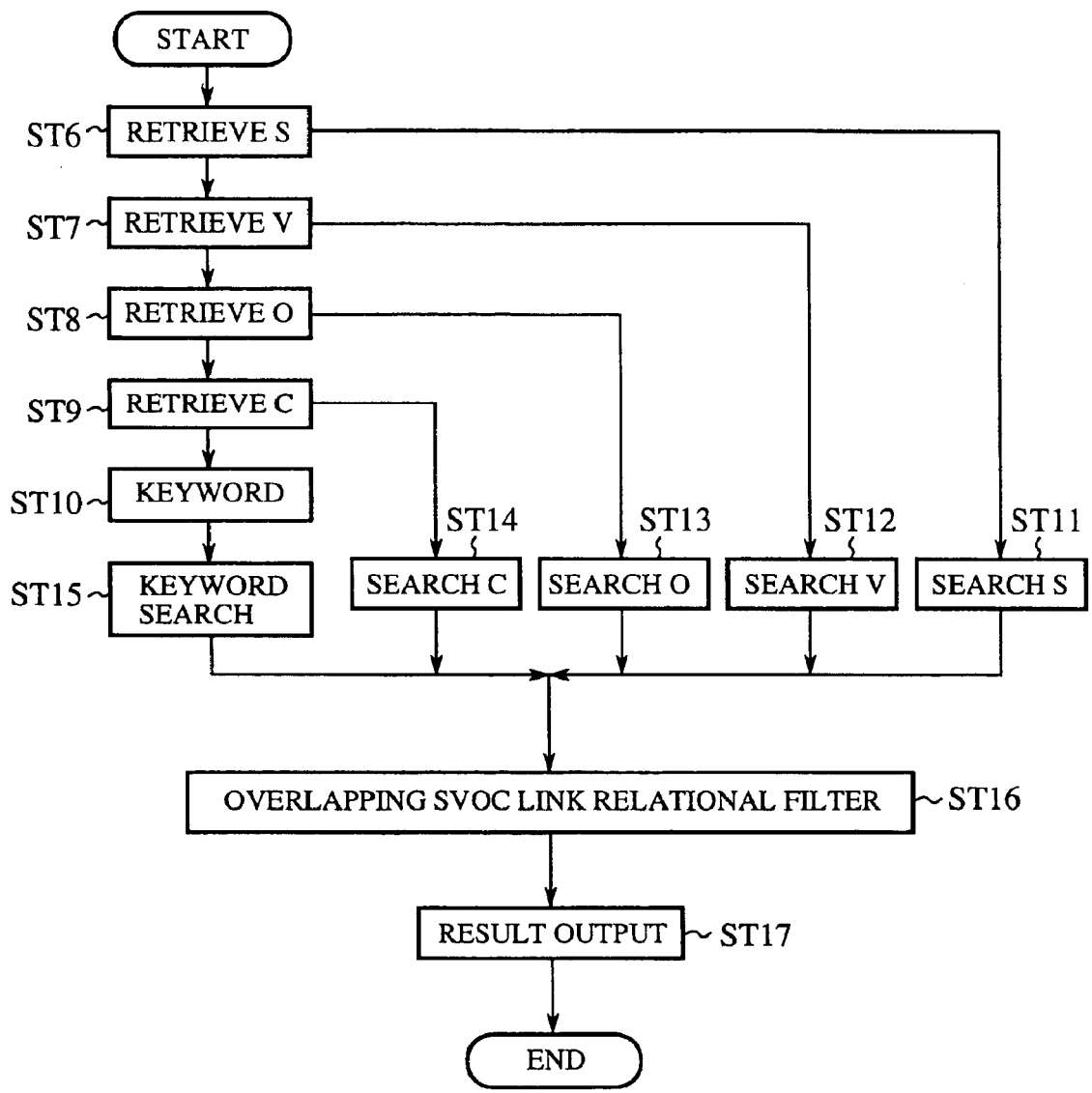
FIG. 7 is a flowchart showing a process starting with input of voice and ending with display of a search result according to the first embodiment.

FIG. 7 is a flowchart showing a process starting with input of voice and ending with display of a search result according to the first embodiment. Referring to FIG. 7, step ST6 is an S retrieval step for analyzing the voice signal in accordance with the sentence grammar of the natural language and retrieving search words corresponding to the S attribute 15a Step ST7 is a V retrieval step for analyzing the voice signal in accordance with the sentence grammar of the natural language and retrieving search words corresponding to the V attribute 15b. Step ST8 is an O retrieval step in which the voice signal is analyzed in accordance with the sentence grammar of the natural language so that search words corresponding to the O attribute 15c are retrieved. Step ST9 is a C retrieval step in which the voice signal is analyzed in accordance with the sentence grammar of the natural language so that search words corresponding to the C attribute 15d are retrieved. Step ST10 is a keyword retrieval step in which the voice signal is analyzed in accordance with the sentence grammar of the natural language so that search words corresponding to the keyword attribute 15e are retrieved.

Step ST11 is a S search step in which the S attribute in the database is searched based on the search word corresponding to the S attribute 15a so as to retrieve a tuple associated with the attribute word that matches the search word. Step ST12 is a V search step in which the V attribute is searched based on the search word corresponding to the V attribute 15b so as to retrieve a tuple associated with the attribute word that matches the search word. Step ST13 is an O search step in which the O attribute is searched based on the search word corresponding to the O attribute 15c so as to retrieve a tuple associated with the attribute word that matches the search word. Step ST14 is a C search step in which the C attribute is searched based on the search word corresponding to the C attribute 15d so as to retrieve a tuple associated with the attribute word that matches the search word. Step ST15 is a keyword search step in which the keyword attribute is searched based on the search word corresponding to the keyword attribute 15e so as to retrieve a tuple associated with the attribute word that matches the search word. Step ST16 is a filtering step in which a plurality of tuples retrieved in the above search steps (ST11–ST15) are subject to filtering such that overlapping tuples are filtered off, and filtering for attribute relation based on the grammatical structure of the natural language is performed. The destination data for the tuple thus retrieved is output as a search result. Step ST17 is a step for displaying the search result.

As described above, according to the first embodiment, the destination data 14 is associated with a plurality of attribute words respectively belonging to the S attribute 15a, the V attribute 15b, the O attribute 15c and the C attribute 15d so that the destination data 14 is stored in the database 3 according to the relational database structure. A search criterion is input using a natural language so that search words corresponding to the S attribute 15a, the V attribute 15b, the O attribute 15c and the C attribute 15d are retrieved from the input information. The retrieved search words are used to search for the destination data 14. By inputting the search criterion using a natural language, a complex search criterion including a plurality of search words can be input for a search. Accordingly, it is easy for even an inexperienced person to input a complex search criterion. Moreover, narrowing of a search for destination data can be efficiently conducted with the complex search criterion.

Second Embodiment

Figure 8:
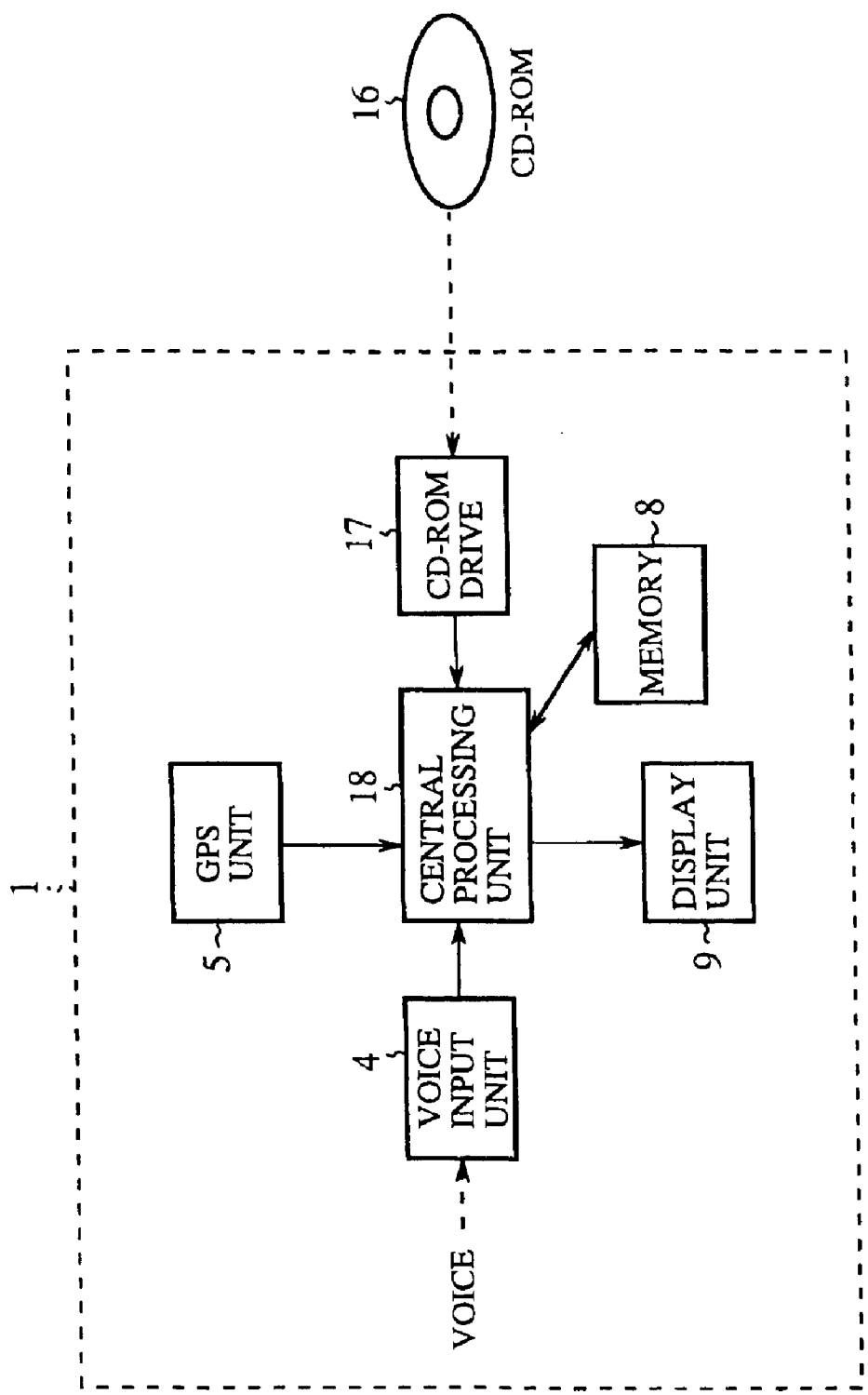
FIG. 8 is a block diagram showing a structure of an object data search apparatus according to a second embodiment of the present invention.

FIG. 8 is a block diagram showing a structure of an object data search apparatus according to a second embodiment of the present invention. Referring to FIG. 8, reference numeral 16 indicates a CD-ROM in which the destination data 14 and the like are stored according to the relational database structure like that of the first embodiment. Numeral 17 indicates a CD-ROM drive for reading data from the CD-ROM 16. Numeral 18 indicates a central processing unit for conducting a search based on the voice signal, location information and the like so as to generate display information and the like. The other aspects of the construction are the same as the corresponding aspects of the first embodiment. Like numerals represent like components and the description thereof is omitted.

A description will now be given of the operation.

Figure 9:
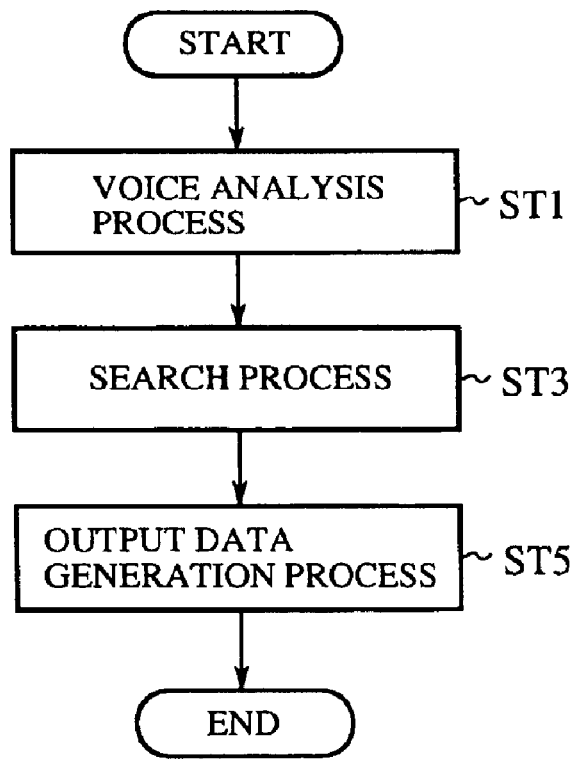
FIG. 9 is a flowchart showing a search process by the central processing unit based on a voice signal according to the second embodiment.

FIG. 9 is a flowchart showing a search process by the central processing unit 18 based on a voice signal according to the second embodiment. The steps disclosed herein are the same as the corresponding steps of the first embodiment. Like numerals represent like components and the description thereof is omitted.

According to the second embodiment, the destination data 14 is associated with a plurality of attribute words respectively belonging to the S attribute 15a, the V attribute 15b, the O attribute 15c and the C attribute 15d so that the destination data 14 is stored in the CD-ROM 16 according to the relational database structure. A search criterion is input using a natural language so that search words corresponding to the S attribute 15a, the V attribute 15b, the O attribute 15c and the C attribute 15d are retrieved from the input information. The retrieved search words are used to search for the destination data 14. By inputting the search criterion using a natural language, a complex search criterion including a plurality of search words can be input for a search. Accordingly, it is easy for even an inexperienced person to input a complex search criterion. Moreover, narrowing of a search for the destination data 14 can be efficiently conducted with the complex search criterion.

In the foregoing embodiments, only those examples with a sentence structure of SVOC are given. However, the present invention may also be applied to sentence structures such as SV and SVCC.

In the foregoing embodiments, it is assumed that the present invention is used in a car navigation system. The present invention may also be used as a data search apparatus provided at an information provider center providing information via a portable telephone.

When the voice recognition partially fails in the foregoing embodiments, a user may be prompted for only those elements of SVOC producing a failure in recognition.

In the foregoing embodiments, the navigation server 2 for storing, searching for and providing database information is provided so as to be separate from the navigation system. Alternatively, the navigation server may be built in the car navigation system. In this case, a CD-ROM or a DVD-ROM may be used as a database.

INDUSTRIAL APPLICABILITY

As described above, the object data search apparatus, the object data search method and the computer-readable recording medium storing data according to the invention enables efficient narrowing of object data search using a simple search criterion input and is therefore suitable for voice input search in a car navigation system or the like.

What is claimed is:

1. An object data search apparatus comprising:
   a database for storing destination object data in association with a plurality of categorized attribute words categorized according to sentence elements of a natural language;
   an input unit for receiving an input of search criteria in the form of a sentence of the natural language;
   a criteria retrieval unit for analyzing the search criteria in the form of the sentence and retrieving one or a plurality of categorized search words respectively categorized corresponding to sentence element categories of the natural language;
   a destination object retrieval unit for categorically searching sentence categories of the database using each of the categorized search words respectively associated with the sentence element categories, and retrieving the destination object data associated with the categorized attribute words that match a single search word or a plurality of search words in the same category, wherein filtering for attribute relation based on the grammatical structure of the natural language is performed; and
   an output apparatus for outputting the destination object data thus retrieved.

2. The object data search apparatus according to claim 1, wherein said database stores destination object data at least associated with an attribute word having an agent of action category, an attribute word having an action category and an attribute word having an object of action category.

3. The object data search apparatus according to claim 1, said object retrieval unit retrieving a plurality of tuples and filtering the tuples so that overlapping tuples are filtered off.

4. The object data search apparatus according to claim 1, wherein said input unit is a voice input unit for receiving a voice input of search criteria in the form of a sentence of the natural language.

5. A destination-of-travel object data search method comprising the steps of:
   receiving an input of search criteria in the form of a sentence of a natural language;
   retrieving a plurality of search words from the search criteria input in the form of a sentence of a natural language by analyzing and categorizing the search criteria in accordance with a grammar of the natural language;
   conducting a category-by-category search relative to a plurality of sentence element categories associated with a plurality of destination-of-travel object data items, based on the plurality of search words; and
   retrieving the destination-of-travel object data associated with the attribute word that matches a single search word or a plurality of search words and outputting the destination-of-travel object data thus retrieved;
   said conducting and retrieving using at least a search word having an agent of action category, a search word having an action category and a search word having an object of action category.

6. The destination-of-travel object data search method according to claim 5, said receiving step receiving a voice input of search criteria in the form of a sentence of the natural language.

7. A method of searching destination-of-travel object data comprising:
   storing destination-of-travel object data in association with a plurality of categorized attribute words, wherein the attribute words are categorized and stored according to sentence elements of a natural language;
   receiving an input of search criteria in the form of a sentence of a natural language;
   analyzing the search criteria in the form of the sentence and retrieving at least one of a plurality of search words respectively corresponding to sentence element categories of the natural language;
   searching sentence element categories of the database using each of the search words respectively associated with the sentence element categories, and retrieving the destination-of-travel object data associated with the categorized attribute words that match a single search word or a plurality of search words in the same category, wherein filtering for attribute relation based on the grammatical structure of the natural language is performed; and outputting the destination-of-travel object data thus retrieved.

8. The method of searching destination-of-travel object data according to claim 7, said receiving step receiving a voice input of search criteria in the form of a sentence of the natural language.

9. A method for determining a destination based on a natural language query, comprising:

storing destination object data in association with categorized attribute words categorized according to sentence elements of the natural language, wherein the categories include agent-of-action, action, and object-of-action categories;

inputting a query utilizing a natural language sentence;

retrieving one or more categorized search words from the query such that each search word has an associated one of the categories corresponding to sentence elements of the natural language;

categorically searching the attribute words for a match with the retrieved search word and retrieving the destination object data associated with the attribute word that matches the search word, wherein the category of attribute words searched by said searching step corresponds to the category of the search word, and outputting the destination object data retrieved by said categorical search.

10. The method according to claim 9, said categorical searching including:

when the search word is in the agent-of-action category, searching the agent-of-action category for a match with the search word;

when the search word is in the action category, searching the action category for a match with the search word; and when the search word is in the object-of-action category, searching the object-of-action category for a match with the search word.

11. The method according to claim 9, wherein the categories include agent-of-action, action, object-of-action, and key word categories.

12. The method according to claim 11, wherein the destination object data includes destination position information and name information of a destination.

13. The method according to claim 9, further comprising:

filtering for attribute relation based on a grammatical structure of the query.

14. The method according to claim 9, said inputting step inputting a voiced query utilizing the natural language sentence and said retrieving step retrieving one or more categorized search words from the voiced query.

* * * * *